(12) United States Patent
Chen et al.

(10) Patent No.: US 11,086,308 B2
(45) Date of Patent: Aug. 10, 2021

(54) COOPERATIVE AND COMPRESSIVE SENSING SYSTEM

(71) Applicant: Avago Technologies International Sales Pte. Limited, Singapore (SG)

(72) Inventors: Xuemin Chen, Rancho Santa Fe, CA (US); Michael David Johas Teener, Santa Cruz, CA (US); Wael William Diab, San Francisco, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 141 days.

(21) Appl. No.: 16/550,292

(22) Filed: Aug. 26, 2019

(65) Prior Publication Data

US 2019/0384271 A1 Dec. 19, 2019

Related U.S. Application Data

(63) Continuation of application No. 14/152,418, filed on Jan. 10, 2014, now Pat. No. 10,401,846.

(60) Provisional application No. 61/902,795, filed on Nov. 12, 2013, provisional application No. 61/863,278, filed on Aug. 7, 2013.

(51) Int. Cl.
*G05B 23/02* (2006.01)
(52) U.S. Cl.
CPC ................ *G05B 23/0221* (2013.01)
(58) Field of Classification Search
CPC .................................. G05B 23/0221
See application file for complete search history.

(56) References Cited

U.S. PATENT DOCUMENTS

| 5,045,135 | A | * | 9/1991 | Meissner | A61F 13/15772 156/351 |
| 5,455,845 | A | * | 10/1995 | Sullivan | H03D 3/02 375/317 |
| 6,253,159 | B1 | * | 6/2001 | Bett | G05B 19/41875 702/85 |
| 7,130,709 | B2 | * | 10/2006 | Popp | A61F 13/15772 700/122 |

(Continued)

FOREIGN PATENT DOCUMENTS

| WO | 00/40196 A1 | | 7/2000 |
| WO | WO0040196 | * | 7/2000 |
| WO | 2013/072925 A2 | | 5/2013 |

*Primary Examiner* — John E Breene
*Assistant Examiner* — Jeffrey C Morgan
(74) *Attorney, Agent, or Firm* — Morgan, Lewis & Bockius LLP

(57) ABSTRACT

A system for sensing in an industrial environment includes a processing node configured to receive a first sensor data from a first sensor and a second sensor data from a second sensor, both of which are disposed in the industrial environment. The processing node is further configured to process randomly sampled data from at least one of the first sensor data and the second sensor data to generate processed sensor data that includes the randomly sampled data. The processing node further configured to identify data of interest from the processed sensor data based on comparison of the processed sensor data with a sampling dictionary of predetermined information. The processing node further configured to filter and assemble the identified data of interest to create a set of compressed data, and transmit the set of compressed data to a predetermined destination.

20 Claims, 6 Drawing Sheets

(56) References Cited

U.S. PATENT DOCUMENTS

2013/0007053 A1  1/2013  Yun et al.
2013/0253897 A1  9/2013  Kanbe et al.

* cited by examiner

COOPERATIVE AND COMPRESSIVE SENSING SYSTEM

CROSS-REFERENCE TO RELATED APPLICATIONS

This application is a continuation of U.S. application Ser. No. 14/152,418, filed Jan. 10, 2014, which claims the benefit of priority from U.S. Provisional Application No. 61/863,278, filed on Aug. 7, 2013, and U.S. Provisional Application No. 61/902,795, filed on Nov. 12, 2013, the entire contents of each are incorporated herein by reference.

TECHNICAL FIELD

This disclosure relates to sensing. This disclosure also relates to sensing and data reconstruction using data obtained from multiple sensors, for example, operating in a network configuration in an industrial environment.

BACKGROUND

Rapid advances in sensors, control systems, and manufacturing techniques have led to the worldwide adoption of automated manufacturing techniques for every imaginable product. The manufacturing techniques include automation and process control, and operate over an extreme range of temperature, vibration, electrical and acoustic noise, humidity, and other environmental characteristics. Multiple types of sensors monitor the manufacturing techniques. Improvements in sensing and data reconstruction will extend the capabilities of automated manufacturing.

DETAILED DESCRIPTION

Figure 1:
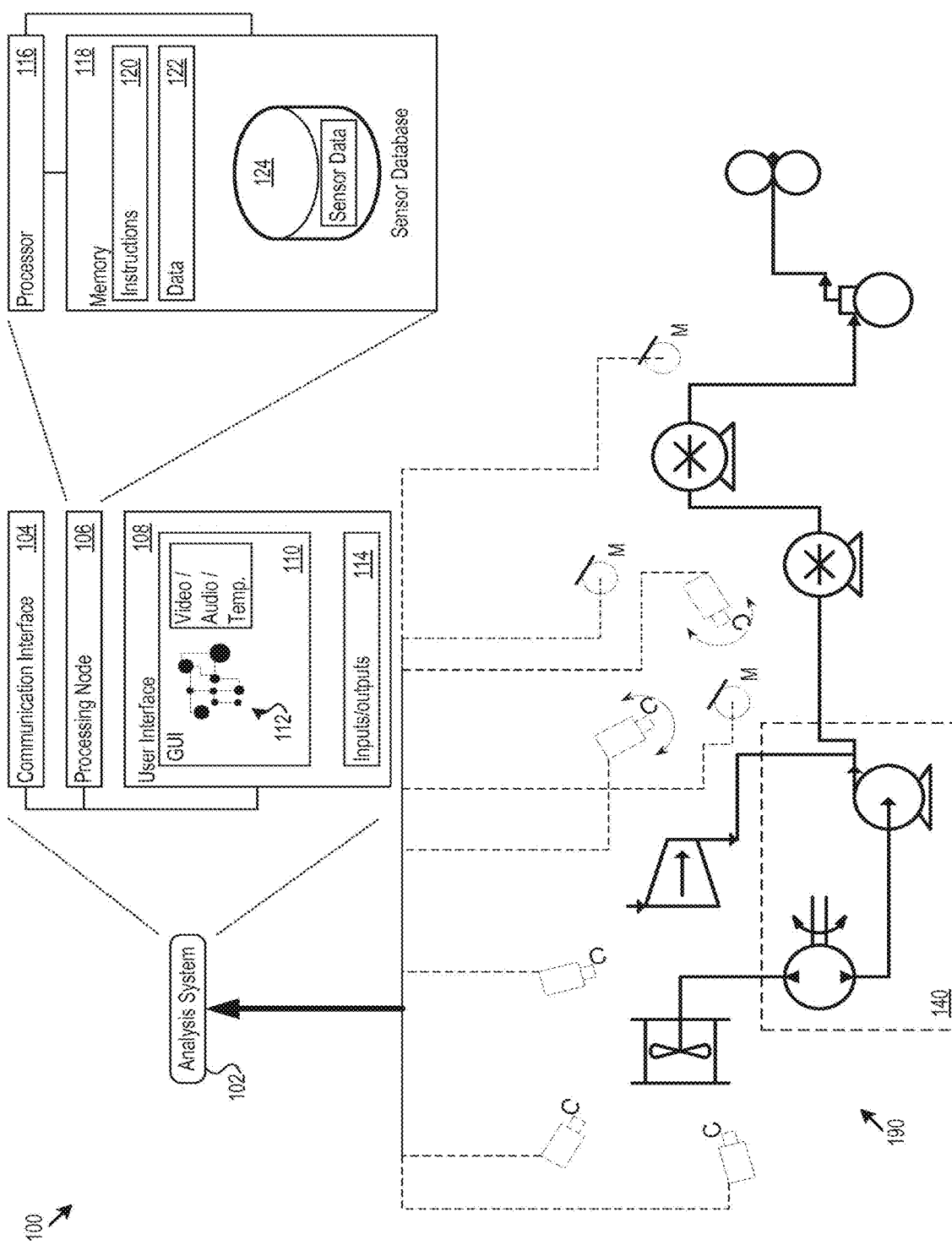
FIG. 1 shows an example of an environment sensed by multiple sensors.

FIG. 1 shows an example of an environment 100 sensed by multiple sensors. The environment may be any industrial environment, such as a manufacturing process line, an industrial materials processing plant, or a factory inventory area. The environment is not limited to industrial settings, however, and any environment in which sensing might be useful is a possibility, such as a classroom, a sports event, a public beach, and a courtroom.

An example analysis system 102 is present, and may implement any of the techniques described. The analysis system 102 includes one or more communication interfaces 104, one or more processing nodes 106, and one or more user interfaces 108. The communication interface 104 may include one or more communication ports, such as Ethernet ports, wireless ports, cellular telephony interfaces, serial or parallel link ports, such as FireWire™, USB, or RS232, or any other type of wired or wireless communication protocol interface. In an example, the communication interface may be identified by one or more unique identifiers in a network environment, such as a TCP/IP and/or a MAC address. In addition, the communication interface 104 may include input/output (I/O) functionality capable of receiving analog and/or digital signals, and may include the capability to process signals such as by scaling, conversion (protocol conversion, analog-to-digital conversion, digital-to-analog conversion, and the like), or any other form of processing to change the format, characteristics, and/or configuration of received and transmitted signals. The communication interface 104 can, for example, send and receive over a network, sensor data from the sensors present in the environment 100. In addition, the communication interface 104 can communicate with other devices and networks.

In FIG. 1, the sensors include cameras, C, and microphones, M. In other examples, any other types of sensors may be present, including vibration, humidity, temperature, stress, pressure, and other sensors. The sensors sense data about the environment 100. In the example in FIG. 1, the sensors monitor an example process line 190. In other example, any other form of industrial application(s) may be monitored with the sensors.

The user interface 108 may display, for example, a graphical user interface (GUI) 110. The analysis system 102 may process any of the sensor data received from the sensors, and display through the GUI 110 any type of reconstruction interface 112, such as a video review interface, audio review interface, or other review interface for analysis of the sensor data. The user inputs/outputs 114 may provide keyboard, mouse, voice recognition, touchscreen, and any other type of input/output mechanisms for user interaction with the analysis system 102.

The processing node 106 may be implemented with hardware, and may include software based functionality. In one implementation, the processing node 106 includes one or more processors 116 and memories 118. The memory 118 may store instructions 120 (such as, program instructions or logic) for execution or control by the processor 116. The instructions 120 may be used by the processor 116 to control the analysis system 102, including the control of any of the compressive sensing and data reconstruction techniques explained later. The instructions 120 may also generate the GUI 110 and be used in connection with data 122 or in a sensor database 124 stored in the memory 118. The processors may be configured to include a general processor, a digital signal processor, an application specific integrated circuit, a field programmable gate array, an analog circuit, a digital circuit, a server processor, combinations thereof, or other now known or later developed processor(s). The memory 118 may include any one, or any combination, of various types of memory, such as, for example, random access memory, flash memory or a hard drive. Additionally, or alternatively, the memory may include a removable memory such as, for example, a compact disk (CD), a DVD, a memory card, or the like.

Each module described herein is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by the processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include the processor. In some examples, each module may include only memory storing instructions executable with a processor to implement the features of the corresponding module without the module including any other hardware. Because each module includes at least some hardware, even when the included hardware includes software, each module may be interchangeably referred to as a hardware module.

The sensors may capture non-compressed raw data which is forwarded via a network/link to a post processing node, such as the analysis system 120. Communication by the sensors may be via respective communication ports, such as Ethernet ports, wireless ports, cellular telephony interfaces, serial or parallel link ports, such as FireWire™, USB, or RS232, or any other type of wired or wireless communication protocol interface. In an example, the sensors may be identified by one or more unique identifiers in a network environment, such as a TCP/IP and/or a MAC address. The analysis system 102 may employ (i) lossy encoding, or (ii) directly analyze content within the non-compressed data. In addition, or alternatively, the sensors may employ compressed sensing by, for example, using lossy compression in the capture process itself. Alternatively, or in addition, the analysis system 102 may employ random sampling using the output of the sensors to obtain randomly sampled sensor data. Alternatively, or in addition, the sensors my employ random sampling and output randomly sampled sensor data to the analysis system 102.

The analysis system 102 and the sensors can employ adaptive, cooperative, and/or compressive sensing in the environment 100. The analysis system 102 may perform, as a few examples: a) cooperative compressive sensing, b) perspective view extensions to compressive sensing, c) adaptive compressive sensing failover and diagnostics, d) adaptive group compressive sensing based on network events, control events, underlying image content characteristics/correlations, e) switching on the fly between compressive sensing and raw sensing, and/or any other sensor data capture and processing techniques. Leveraging these sensing techniques, the analysis system 102 can reduce and otherwise optimize processed sensor data to create compressed sensor data that enables a user to more efficiently locate, identify and analyze data of interest. Thus, the analysis system 102 can optimize capture, analysis and storage of only that sensor data containing features of interest.

In an example, the sensors may provide data to the system 102 as raw data over a network, such as an Ethernet network, via one or more communication ports included in the sensors. The system 102 may sample the raw data using periodic sampling or random sampling. Using periodic sampling frequencies based on the Nyquist theorem to avoid aliasing, the system 102 may create compressed data using lossy compression to eliminate unnecessary information in the periodically sampled data. Example compression techniques for periodically sampled video data include MPEG4, as well as linear predictive coding (LPC) or frequency transformation coding for periodically sampled audio data.

The system 102 may also use random sampling techniques and create compressed sensor data by identification of data of interest from randomly sampled raw data of one or more sensors. With random sampling, sample rates may be lower than with periodic sampling resulting in fewer overall samples. As used herein, the term "sampling" can refer to a process of converting continuous information info a discrete numeric sequence.

Figure 2:
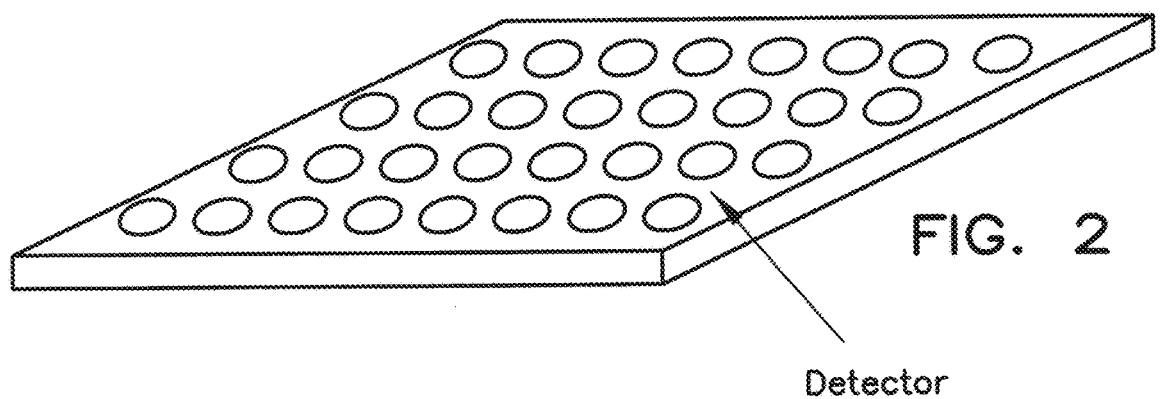
FIG. 2 is an example of sampling a work piece with a sensor.

FIG. 2 illustrates an example of sensor data obtained from a detector sensor operating on a workpiece. The workpiece in this example may be a planar surface upon which a temperature, color, smoothness, or any other operational parameter is sensed. Each part of the sensor data is represented with the series of circles illustrated in a grid pattern. In other examples, any other pattern may be illustrated. With periodic sampling, sampling occurs at a predetermined interval such that a sample of the sensor data is captured at a repeating frequency. For example, periodic sampling of the sensor data illustrated in FIG. 2 may provide a series of samples representing every other illustrated circle. As previously discussed, the periodic sample frequency may be varied, however, according to the Nyquist sampling theorem, too long between periodic samples may result in aliasing when the sample data is reconstructed. Accordingly, periodic sampling generally occurs with relatively short frequency periods resulting in relatively large amounts of data, which may be compressed such as by compression techniques, as previously discussed. With random sampling, on the other hand, there is no repetitive interval (or frequency) of sampling, and the time period between random samples may be variable and relatively long when compared to periodic sampling (since aliasing may not be a concern), resulting in relatively smaller amounts of sample data. Accordingly, random sampling in and of itself represents a data compression technique.

Figure 3:
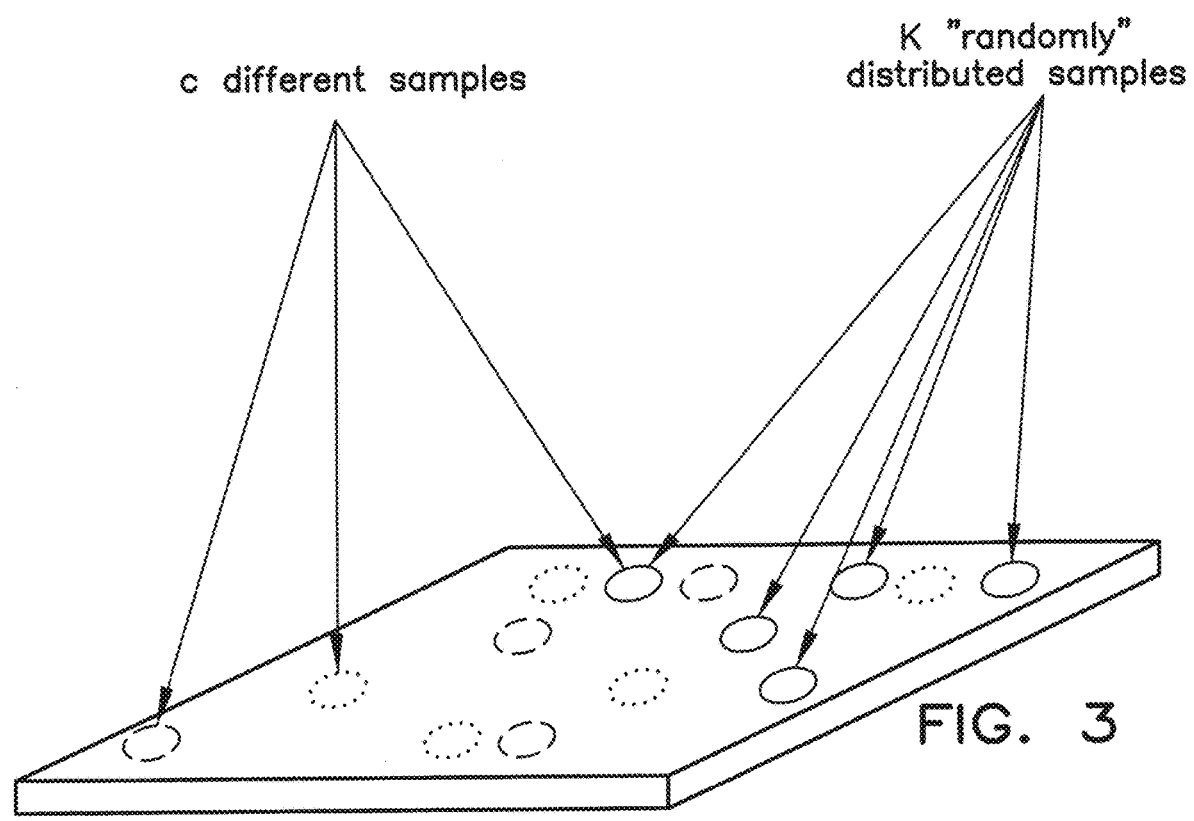
FIG. 3 is an example of random sampling with a random sampling rate.

FIG. 3 is an example of random sampling of the sensor data illustrated in FIG. 2. In FIG. 3, samples of the sensor data are randomly captured. The number of samples that are randomly captured can vary. An example equation to determine the number of random samples used in creation of compressed sample data is:

$$\text{\# of Random Samples} = c*K \quad \text{(Equation 1)}$$

Where c is the number of sets of different samples, and K is the sparsity of the image set of randomly distributed samples within each set. In an example, there may be five or six sets of different samples.

The system 102 may parse raw sensor data, periodic sampled data and/or randomly sampled data of one or more sensors to identify data of interest. Once the data of interest is identified from the raw, periodic and/or randomly sampled data, the system 102 may filter and assemble or package the data of one or more sensors to create compressed data. The compressed data may be transmitted, over a network for example, to a predetermined destination that is selected based on pattern recognition within the identified data of interest. In addition, or alternatively, the system 102 may request/retrieve additional information, such as raw sensor data, sensor data from additional sensors and/or additional samples of the sensor data in order to re-filter, re-assemble or re-package the data to re-create the compressed data to better represent the identified data of interest. Thus, for example, increased resolution of the identified data of interest may be achieved with the re-creation of the compressed data. In an example, the system 102 can change the sample rate of periodic or random sampling to provide additional detail for identified data of interest events.

The system 102 may temporarily or permanently store or cache the sensor data in the memory 118 such as in the sensor database 124. Alternatively, the sensor data may be temporarily or permanently stored at the sensors, or in any other location. The system 102 may periodically sample or randomly sample raw sensor data received from the sensors. Alternatively, the sensors may provide periodically or randomly sampled sensor data to the system 102. The sampled sensor data from one or more sensors may be grouped or combined by the system to form processed sensor data. The processed sensor data may be further analyzed by the system to identify data of interest.

The data of interest may be identified from the sampled sensor data of one sensor, or a group of sensors. The system 102 may perform an analysis for a parameter (or parameters) representative of data of interest. The data of interest may not be readily identifiable based on the sensing of any particular sensor, but rather may be found or converged upon using the sampled sensor data of multiple sensors. Alternatively, the data of interest may be identified based on a time period of data sampled from sensor data of a single sensor. In an example, suppose the system 102 is seeing some information determined from sensor data that is occasionally problematic. By further analysis of the sampled sensor data, the system 102 may extract different or further information. In one sense, the system 102 has extracted the additional information from a "virtual" sensor that provides the further insight into the event of interest. This may be done because the system 102 has access, such as network access, to multiple sources of information from different sensors or subsets of sensors, as well as from sampled and/or raw sensor data.

As an example, assume that four of the cameras in the example of FIG. 1 are located at various different locations but target a single target area 140 in an industrial environment (such as a single work area on a factory floor). A first imaging sensor may include an encoder and communication port for communicating compressed HD video to the system 102. Second and a third imaging sensors may employ compressive sensing techniques in which the compressed sensed data itself is communicated via a communication port to the system 102. A fourth imaging sensor may use compressive sensing to capture sensed data but may also employ a further encoding (transcoding) to produce video output to the system 102. Because of the reduced sampling requirements pieced on image sensors two, three and four, their power and resource utilization may be substantially reduced over that of the first imaging sensor. In addition, the image sensors may work together in a cooperative way to further reduce sampling obligations. For example, the second and third imaging sensors may cooperate via their communication pathways, such as network communication pathways, to both participate in the sampling process at a further reduced rate such that each share in the sensing duties to produce an overall set of compressed sensed data. That is, for example, the second imaging sensor generates a first subset of compressive sensed data associated with a first perspective and delivers that sensor data upstream to the system 102, or any other destination node, such as a smartphone or tablet computer running a media player or object/action recognition application. The third imagine sensors follows suit and delivers a second subset of compressed sensed data associated with a second perspective.

The system 102 can take the perspectives into account and construct, for example, a two dimensional (2D) or a three dimensional (3D) video by combining the two streams. Further, if the second imaging sensor is identified as having a communication performance issue in the delivery pathway, the system 102 may offload all or some of the sampling duties associated with the second sensor to the third imaging sensor. In an alternative example, the second sensor may negotiate through the system or directly with the third sensor, to offload all or some of the sampling duties to the third imaging sensor. One result may be significantly reducing cost and power by providing many cooperating compressive image sensors for each target area.

Expressed another way, there may be multiple sensors looking at different perspectives (such as angles) and obtaining sensor data (such as pixels) for that perspective. The system 102 may therefore avoid recapturing the same or substantially similar data repeatedly on a single sensor or via multiple collocated sensors. In addition, any sensor, such as, the second compressive imaging sensor can be modified to receive the compressed sensed data from the third compressive imaging sensor and perform the combination with its own sensed data to produce a combined sensed data stream. The second sensor may then, as just a few examples: (i) communicate the combined sensed data stream as a single combined stream to the system 102; (ii) encode or transcode the sensed data into a video stream of any type, such as an MPEG, S-video, RGB, Component or other standard; (iii) process the sensed data locally for object/action recognition or any other processing task.

In some example embodiments both the second and third compressive imaging sensors may individually perform object/action recognition based on their sensed data locally within each sensor. In any event, a sensor that detects a predefined trigger, such as an interesting situation represented with data of interest, may then respond, such as by increasing its sampling rate if performing periodic or random sampling. In an embodiment, sensors may also communicate cooperatively with any other sensor, such as to request that the other sensor increase its sampling rate as well. Likewise, the system 102 or any other upstream application may detect something of interest or respond to a user interaction and communicate to any sensor or combination of sensors to command a sensor change, such as increases or decreases in sampling rate, resolution, color accuracy, sensed wavelength, or other change. Another example of a sensor change is to send a request to place a sensor into a sleep state while having a different sensor take over sensing duties of the sensor in sleep mode.

In addition, with cooperative compressive sensing, the compressive sensing may be beneficially altered to take into account multiple sensing elements and perspectives (with its underlying increased resolution capability) to provide even better overall sensing compression at same output quality levels. Compressive sensing with diagnostics support, such as where compressive sensing is carried out across two or more sensors (of any type), if one stops functioning, other(s) may provide addition input. The system 102 may layer in diagnostics, such as by releasing one sensor for self-diagnostics and possibly to assist in diagnostics of other sensors, then returning to the shared compressive sensing arrangement. The system 102 may then take other sensors offline for diagnostics in the same manner.

Figure 4:
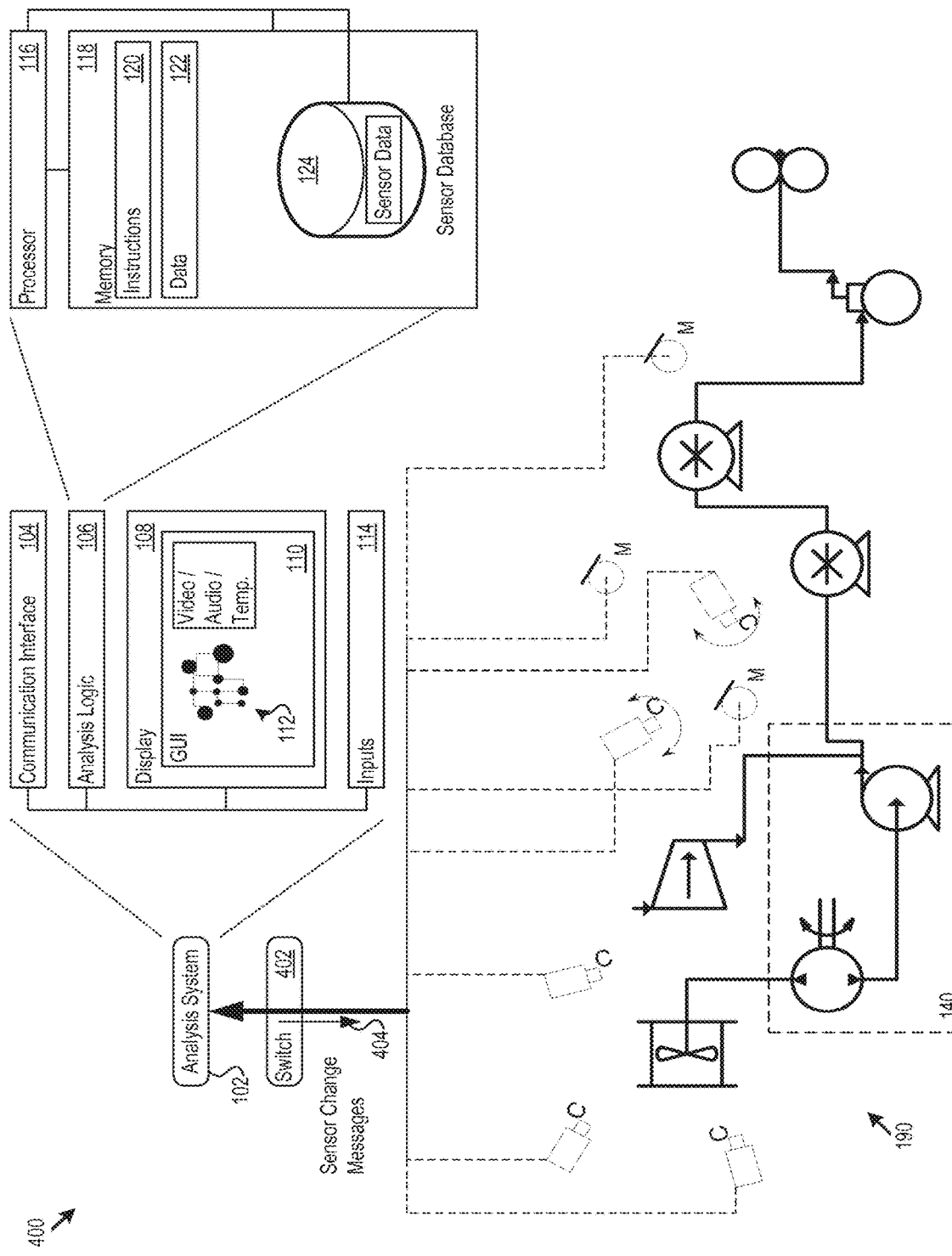
FIG. 4 is another example of an environment sensed by multiple sensors.

In another implementation, shown in FIG. 4, a sensing architecture 400 may implement compressive sensing decisions at a network node, such as inside of a switch 402. For example, for packets labeled as particularly sensitive, the switch 402 may report back toward any given sensor to cause that sensor to adapt according to a specified sensor change 404. Note that in the architecture above, multiple devices cooperate to create an overall picture of the environment 100. As a result, the failure of one or even many sensors may not result in a failure of the process line 190.

Other aspects of the sensing architecture include using a compressive form of capturing to conserve bandwidth. In addition, the architectures can use multiple perspectives of views to coordinate data among different sensors for adaptive/compressive sensing. The techniques may apply to any sensed data, not only imaging data. Some implementations use multiple sensors, such as cameras, at different angles to collect sensor data and sample, for example, an image.

The sensors may execute compressive sensing in that, while they may be capable of performing sampling at twice the bandwidth of the sensed phenomenon, they may also sense in a mode that samples less frequently or that compresses (such as in a lossy manner) the sensed data. The compressive sensing applies to video, audio and any other type of sensor data.

In other implementations, the analysis system 102 may support compressive sensing with diagnostics support. For example, where compressive sensing is carried out across two or more sensors (of any type), if one sensor stops functioning or communication is interrupted or deficient, the other sensor(s) may fill in for the failed sensor. The analysis system 102 is aware and provides diagnostics, such as by releasing one sensor for self-diagnostics and possibly to assist in diagnostics of other(s), then returning to the shared compressive sensing arrangement. Other sensors may then be taken offline for diagnostics in the same manner. The analysis system 102 may also implement coordinated random sampling across the sensors. In addition, the analysis system 102 may employ compressive sensing adaptation to service control signaling. For example, the analysis system 102 may inject control behaviors into compressive sensing, for example when the system 102 examines the sensed data and recognizes a trigger, and then in response takes a sensor management action such as increasing sampling (or decreasing compression) or triggers other control behaviors. In another example, where the sensed data is determined as critical data, the system 102 may revert to a sensor with a more robust or faster communication path, such as a wired network communication path, instead of a less robust communication path such as a wireless network communication path with narrower bandwidth or a longer communication path (more hops), which introduces latency.

Figure 5:
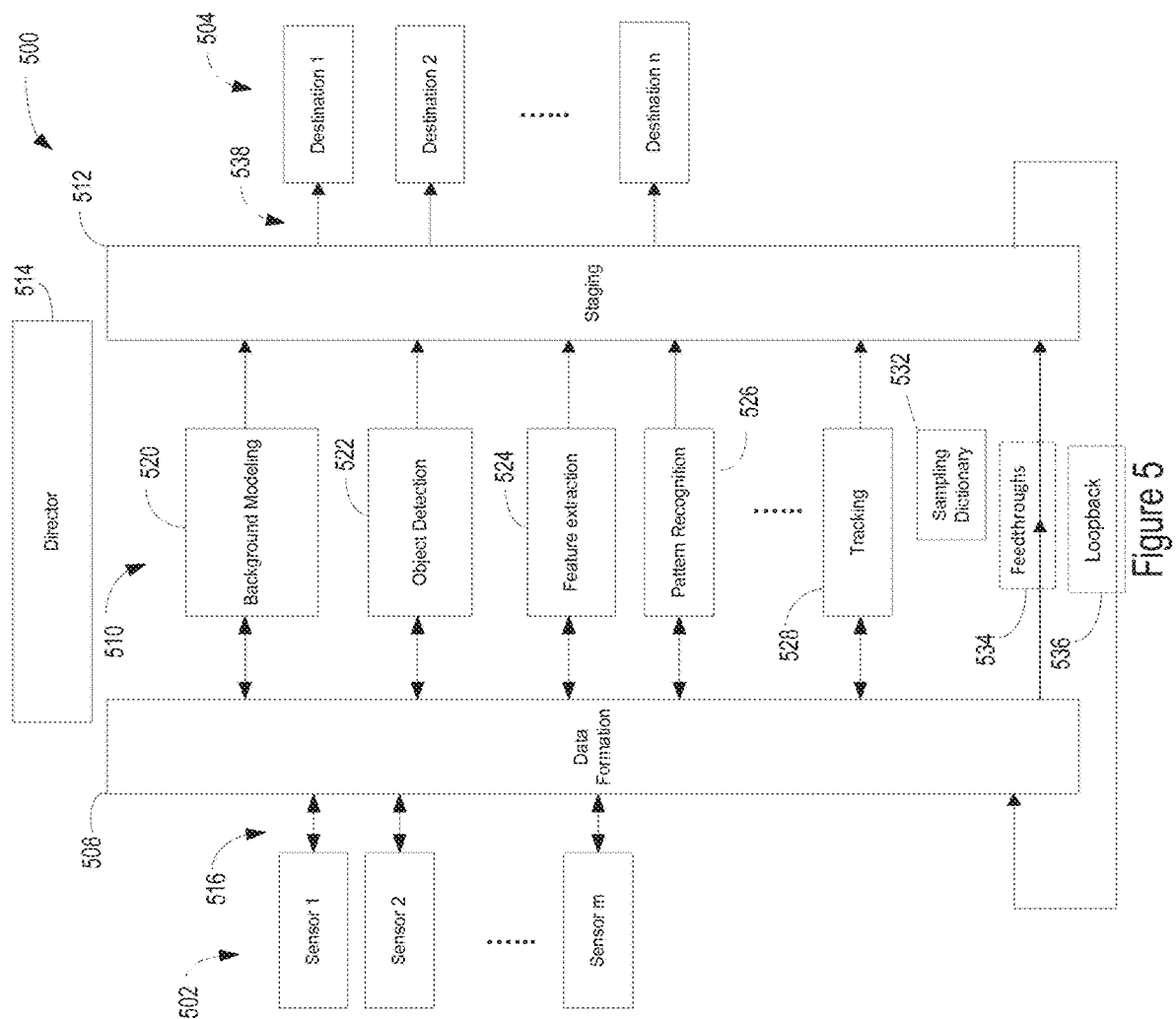
FIG. 5 is a block diagram example sensors, an analysis system and destinations.

FIG. 5 is an example block diagram of an analysis system 500 in communication with one or more sensors 502, and one or more destinations 504. The sensors 502, as previously discussed, may be any form of sensing device positioned in an industrial environment to detect conditions within the industrial environment. The destinations 504 may be individual users, groups of users, data collection systems, process control systems, or any other recipient that can use the output of the analysis system 500 to operate, analyze or improve the industrial environment being sensed.

The analysis system 500 may include a data formation module 508, a plurality of recognition modules 510, a staging module 512, and a director module 514. The modules may be included on one or more computing devices, such as a server computer, a programmable logic controller, a distributed control system, or any other computing device or system. The modules may communicate over dedicated lines, a network, a communication bus, or any other communication platform. In other examples fewer or greater numbers of modules may be used to represent the functionality described. Sensor data, such as raw sensor data, or compressed sensor data may be received via respective communication ports (not shown) on sensor data lines 516, such as a network, by the data formation module 508. In other embodiments, the functionality described may be performed with multiple different systems. Also, in other embodiments, some or all of the functionality described may be performed at the switch and/or included in the sensors.

The data formation module 508 may receive and process the sensor data. The sensor data received can be raw sensor data, compressed sensor data, processed sensor data or any other form or format of data representative of the sensor data. For example, a first sensor may include an encoder and communication port for communicating encoded sensor data, a second sensor may employ compressive sensing techniques where the compressed sensed data itself is communicated via a port, and a fourth may use compressive sensing to capture sensed data but may also employ a further encoding (transcoding) scheme to produce a predefined format output. The data formation module 508 may receive and process the sensor data and generate processed sensor data.

The processing of the received sensor data by the data formation module 508 may include any form of processing to obtain the desired sensor data. For example, video based processing by the data formation module 508 may include color conversion, integral image processing, image pyramid (2×2 block averaging) processing, non-maximum suppression (3×3, 5×5, and 7×7) processing, gradient image pyramid (5-tap) processing, Gaussian image pyramid (5-tap) processing, first-order recursive infinite impulse response (IIR) filters (horizontal & vertical) processing, and/or sum of absolute different (SAD)-based disparity for stereo processing. For other forms of sensor data, other forms of processing can be employed, such as periodic sampling, random sampling, encoding, decoding, interpolation, averaging, smoothing, or any other data processing techniques.

In an example embodiment, processing with the data formation module 508 may include one or more of: 1) sensor data sampling, 2) sensor data selection, 3) combining of sensor data and 4) synchronization of sensor data. Sampling of the sensor data may include periodic or random sampling. The type of sampling perform by the data formation module 508 may be predetermined in accordance with the sensor from which the sensor data is received and/or the respective reference module 510 to which the processed sensor data is to be provided. Accordingly, sensor data from a sensor may be randomly sampled at 1% random sampling and mapped for use by a first recognition module, and randomly sampled at 10% random sampling and mapped for use by a second recognition module. In this example, the rate of random sampling may be based on the type of recognition being performed by the respective recognition module, where the type of recognition performed by the first recognition module is more effective and/or efficient with less randomly sampled data, whereas the second recognition module is more effective and/or efficient with relatively larger amounts of randomly sampled data. Different periodic sample rates may also be used in accordance with the respective recognition module to which the processed sample data is mapped.

Alternatively, or in addition, the type of sampling and/or the frequency of sampling may be dynamically adjusted based on a request from a respective one of the recognition modules 510 and/or the staging module 512. For example, based on the data of interest identified, one of the recognition modules 510 may request increased detail, such as by requesting an increase in the rate of random or periodic sampling of previously stored raw sensor data or currently received raw sensor data. In other examples, raw sensor data (cached, stored or current sensor data) may be passed to a respective recognition module in response to a request.

Similarly, sensor data sampled at a different sample rate than what was initially provided may be generated and provided as revised sample data in response to a request. Accordingly, stored or cached sensor data from a period of time within which data of interest has been identified by a recognition module 510 may be provided to the recognition module 510 to enable further development of the data of interest by the respective recognition module 510. Alternatively, or in addition, the staging module 512 may provide instructions to the data formation module 508 to adjust the processed sensor data.

With regard to selection of sensor data, the data formation module 508 may dynamically select sensor data of one or more different sensors dependent upon a respective recognition module 510 for which the data is intended. Alternatively, or in addition, selection of sensor data may be based on the level of importance of the sensor data, such that network latency or data, volume may be a consideration in selection. For example, for critical sensor data, a sensor may be selected based on the sensor communicating via a communication port over a more robust wired network connection, such as an Ethernet connection, rather than a wireless network connection having a relatively lower bandwidth or higher transmission latency. In addition, dynamic selection of sensors may include selection based on performance of a communication path over the communication link 516, which can be dependent upon the type and/or content of compressed data. If the compressed data is critical information such as for a critical process, or time critical, such as control logic data, the system 102 may choose a sensor using a communication path with lower latency, such as fewer hoops, larger bandwidth, and/or higher reliability, such as a wired network communication path. Mapping of sensor data to one or more recognition modules 510 may be based on predefined mapping, or may be dynamically selected based on instructions provided by a respective recognition module 510, multiplexing, industrial environment based triggers, or other data selection technique. In other examples, selection of sensor data by the data formation module 508 may be based on the sensor data changing by more than a predetermined threshold or being outside a predetermined threshold. In other examples, the sensor data from different sensors may be selected based on operational considerations, such as robustness/qualify level of the communication path, a level of the quality of the sensor data, and/or comparison of differences with data from other nearby sensors. For example, when sensor data is identified as noisy, delayed or intermittent, another sensor may be selected. In another example, sensors may be assigned a predetermined priority such that sensors with a higher priority that meet predefined criteria such as thresholds, quality levels, robustness of communications, or any other parameters may be selected.

Selection of sensors may also involve cooperative compressive sensing in which the output of multiple sensors are selected for combination to create more robust sensor data or to create redundancy/failover capability. Also, selection of a group of sensors may be performed to obtain sensor data. Selection may involve identifying sensors for a group, adding sensors to an existing group and/or removing sensors from group. Sensor data from each sensor in a group of sensors may be changed by adding or subtracting sensors from the group based on instructions received from the recognition modules 510. For example, a respective recognition module 510 may request additional sensor data from other sensors in response to identification of data of interest. Accordingly, based on selection of changed groups of sensors from which to process sensor data, the data formation module 508 may vary the perspective of the sensor data collected. For example, in the case of video sensor data, additional views may be included to enhance data of interest, and/or to create multidimensional views. In an example of a network configuration, different sensors may be readily available and dynamically selectable based on a unique identifier of the sensor or sensor ports, such as a TCP/IP address and/or MAC address.

The data formation module 508 may also combine the sensor data based on the predetermined mapping, a priority assigned or determined for the sensors, and/or based on instructions received from the recognition modules 510. Combination of the sensor data may involve combining sensor data from multiple sensors into fewer data streams. As part of the combining process, sensor devices may be used to cooperatively enhances the preprocessed sensor data provided to the recognition modules 510. For example, sampling requirements for individual sensors to be combined may be reduced and/or changed from periodic to random resulting in reductions in power and resources to coiled and process the sensor data. In an example, a first sensor can generate a first subset of sensed data associated with a first perspective and a second sensor can generate a second subset of sensed data associated with a second perspective. The data formation module 508 can take the perspectives into account and construct either a single stream of sensor data by combining the two streams. In other examples, one of the sensors in the group may collect and combine the streams.

Combining the sensor data from multiple sensors may also include time alignment of different sensor data based on time stamps, time of receipt or any other timing mechanism so that a combination of sensor data from multiple sensors can be efficiently combined, such as to avoid or create overlapping data. Also, sensor data from multiple sensors may be combined based on instructions received from a respective recognition module in which a time period of data of interest is used to capture and synchronize available sensor data from within that same time period. In other example embodiments, process inputs, such as particular process related events, may be used to trigger different combinations of sensor data from multiple sensors. For example, when it is known that there will likely be beneficial information from the combination of sensor data from three different sensors at a particular event in the industrial environment process, such information can be combined during the event. The processed sensor data may be provided to one or more of the recognition modules 510.

The recognition modules 510 may include a number of different modules each representing a different form of recognition dependent on the nature of the data of interest being sought. In the example of FIG. 5, the recognition modules include a background modeling module 520, an object detection module 522, a feature extraction module 524, a pattern recognition module 526 and a tracking module 528. In other examples, additional or fewer modules may be included. The recognition modules 510 may identify features of interest in any of a variety of different ways. For example, the recognition modules 510 can compare the processed sensor data with a sampling dictionary 528 in order to identify data of interest. The sampling dictionary 528 may be a single database, or multiple databases supporting one or more of the recognition modules 510. The recognition modules 510 may identify data of interest within the processed sensor data based on comparison of the processed sensor data with the sampling dictionary 528. In addition or alternatively, the recognition modules 510 may use smoothing, gradient computations, non-maximum suppression, hysteresis analysis, or any other data analysis technique to identify data of interest in the processed sensor data. In other examples, such as involving video sensor data, the recognition modules 510 may use other techniques, such as Lucas-Kanade Feature Tracking (7×7), Kalman filtering, Nelder-Mead Simplex optimization, Bhattacharya distance, or any other technique to identify features of interest in the processed sensor data. In other examples, the recognition modules and corresponding recognition may occur at the sensors themselves.

Processed sensor data provided to the recognition modules 510 may be sampled at different sample rates dependent upon the particular data of interest to be identified. For example, sensor data of a first sensor may be randomly sampled at 1% random sampling and provided to the object detection module 522. The same sensor data of the first sensor may be randomly sampled at 10% random sampling and provided to the tracking module 528. In this example the granularity of the sensor data needs to be relatively high for the tracking module 528 and relatively low for the object detection module 522 allowing the respective recognition module to receive only that amount of processed sensor data needed to identify respective tracking data of interest and object detection data of interest.

Thus, the processed sensor data being provided by the data formation module 508 can be processed to minimize the quantity of data, while optimizing the likelihood of identifying data of interest with the recognition modules 510. As such, significant efficiencies in power consumption, data storage and communication, and utilization of hardware resources may be realized. By avoiding redundant capturing of similar data, efficiency in data collection, such as by using random sampling, and varying the sample rate of periodic and random sampling efficiency in compression of data can be dramatically increased. Moreover, using specialized recognition modules 510, to which only some of the sensor data is provided further improves efficiency and allows for improved accuracy in identifying data of interest.

The background modeling module 520 may identify data of interest based on analysis of background information provided in the sensor data. For example, with randomly sampled data from multiple sensors, data of interest may be identified by first identifying that part of the sensor data which is background information for example, by comparison with predetermined background information included in the sampling dictionary 528, and then identifying anomalies, or unexpected changes in the sensor data. In an example of analysis of video data with the background modeling module 520, techniques such as Luminance Extraction from YUV:422, Exponentially-Weighted Running Mean & Variance, Uniformly-Weighted Running Mean & Variance, Statistical Background Subtraction, Mixture of Gaussians Background Modeling & Subtraction, Morphological Operations (Erosion & Dilation), and Connected Components Labeling may be used to separate and identify data of interest from background information such as light shadows on a floor, wall or ceiling. The object detection module 522 may perform objection detection, using for example, the previously discussed sampling dictionary 532, which can include predetermined objects that are compared to, for example, video sensor data. In an example of the feature extraction module 524, techniques such as Harris Corner Score (7×7), Hough Transform for Lines, Histogram Computation for Integer Scalars, Histogram Computation for Multi-Dimensional Vectors, Weighted Histogram for Integer Scalars, Weighted Histogram for Multi-Dimensional Vectors, Legendre Moments, and/or Canny Edge detection may be used to identify objects and corresponding data of interest. The pattern recognition module 526, may leverage pattern related information stored in the sampling dictionary 532, in the form of data patterns, video patterns, or any other form of predetermined configurations to identify data of interest. The tracking module 528 may use thresholds, volatility indexes, or any other parameters to identify data of interest in the processed sensor data.

Following identification of the data of interest, the recognition modules may feedback instructions to the data formation module 508 and/or the sensors. The instructions may include a request to adjust the sample rates, include/exclude sensor data of other or additional sensors, combine sensor data of multiple sensors, change a group of sensors from which the processed sensor data is provided, or otherwise adjust the processed sensor data, as described elsewhere. In addition to requesting changes to future sensor data provided as processed sensor data, the recognition modules 510 may also request additional sensor data coinciding with identified data of interest. Thus, previously received and processed sensor data may be retrieved from storage, such as sensor data stored in the sensor database, or temporarily cached in the memory of the sensors, and processed by the data formation module 508 to provide additional processed sensor data to the respective recognition module(s) making the request. Recessing to generate the additional processed sensor data may be performed based on the instructions received from the respective recognition module 510.

The recognition modules 510 may also provide the identified data of interest to the staging module 512. Provision of the data of interest may include only those portions of the processed sensor data identified as data of interest. Alternatively, the processed sensor data may be provided to the staging module 512 with the data of interest identified, such as by flagging. The recognition modules 510 may also include a feed through module 534. The feed through module 534 may pass processed sensor data through to the staging module 512 without identification of data of interest. The processed sensor data passed through the feed through module 534 may be, for example, raw sensor data sampled randomly or periodically at a determined sample rate. The staging module 512 may use the passed through data and also send a feedback request message to adjust content of the passed through processed sensor data. The feedback request message may request adjustment of the content of the passed through processed sensor data such as by adjusting the sample rate of randomly or periodically sampled sensor data, the group of sensors from which the processed sensor data is determined, or any other adjustment of the processed sensor data, as discussed.

In FIG. 5, a loopback module 536 is illustrated. The loopback module 536 may be used to perform sequential processing with the recognition modules 510. For example, the background modeling module 520 may identify data of interest in processed sensor data based on analysis of background information provided in the sensor data. The processed sensor data may then be routed via the loopback module 536 to the object detection module 622 for objection detection within the processed sensor data. Object detection by the object detection module 522 can be an independent analysis of the processed sensor data, or may take into consideration the data of interest indicated by other modules, such as the background modeling module 520. Sequential processing of processed sensor data may include any of the recognition modules 510 performing analysis in any order, including multiple rounds of analysis of the same recognition module 510 depending on the desired outcome. In addition, the loopback module 536 may be used to allow the staging module 512 to dynamically select next processing functions among the recognition modules 510. Such selections may include consideration of the data of interest identified by one of the recognition modules 510.

The staging module 512 may receive and further process the identified data of interest. Processing with the staging module 512 includes parsing the data of interest to generate a set of compressed data, and identification of a destination 504 to which the generated set of compressed data is transmitted. Transmission of a generated set of compressed data may be via a communication link 538, such as a network. Parsing of the data interest may involve masking or filtering of the data of interest in accordance with the identified destination. In addition, different data of interest may be combined or otherwise associated by the staging module 512 in accordance with the identified destination. Such different data of interest may be identified by the same recognition module, such as representing a series of events, or may be data of interest identified and provided from two or more different recognition modules 510. Accordingly, generation of compressed data by the staging module 512 may include selection of different data of interest based on identification by the staging module 512 of a relationship of data of interest from two or more different recognition modules 510.

Relationship identification by the staging module 512 may be based on predetermined mapped relationships. For example, data of interest related to changes in data that is other than background by the background modeling module 520, may be mapped to be provided with data of interest related to object identification in the same physical area of the industrial environment by the object detection module 522. Alternatively, or in addition, relationship identification of different identified data of interest may be based on similarities in the processed sensor data from which the data of interest is identified. For example, data of interest identified by the tracking module 528 as representing a change in temperature may be combined with data of interest identified by the object detection module 522 as indicative of a ruptured pine providing cooling.

The set of compressed data generated by the staging module 512 may include randomly sampled data and/or periodically sampled data. The data is referred to as compressed data due to the processing by the data formation module 508 to generate the processed sensor data, the identification of data of interest by the respective recognition modules 510, and the parsing and combining of the data of interest by the staging module 512. Transmission of the compressed data via the communication link 538 to different destinations 504 may be dynamically selected by the staging module 512. Dynamic selection may include selection of a communication path over the communication link 538, which can be dependent upon the type and/or content of compressed data. If the compressed data is critical information such as for a critical process, or time critical, such as control logic data, the system 102 may choose a communication path with lower latency, such as fewer hoops, larger bandwidth, and/or higher reliability, such as a wired network communication path. In another example, where the sensed data is determined as critical data, the system 102 may revert to a destination available over a more robust or faster communication path, such as a wired network communication path, instead of a less robust communication path such as a wireless network communication path with narrower bandwidth or a longer communication path (more hops), which introduces latency.

The resulting set of compressed data transmitted to a destination 504 can represent a significantly smaller data set than would otherwise be provided by the sensors, since only data of interest is provided. As a result, the set of compressed data may be used in a number of ways with little or no further data analysis of the underlying sensor data. For example, control behaviors in the industrial environment may be implemented based on the set of compressed data. In addition, in response to a set of compressed data, the data formation module 508 may receive instructions from the staging module 512 to adjust the processed sensor data such as by changing sample rates, changing from periodic sampling to random sampling, changing a group of sensors from which sensor data is processed, creating or changing constructive combination of sensor data from different sensors, initiating sensor diagnostics and/or failover, or any other of the discussed adjustments to the processed sensor data. In addition, instructions may be provided by the staging module 512 to respective recognition modules 510 to adjust or tailor identification of data of interest based on the set of compressed data.

The director module 514 may oversee and control the operation of the analysis system 500. Accordingly, transmission of data between the modules, as well as communication of modification instructions may controlled by the director module 514. In addition, the director module 514 may provide management and control of the sampling dictionary and mapping of sensors to recognition modules 510.

Figure 6:
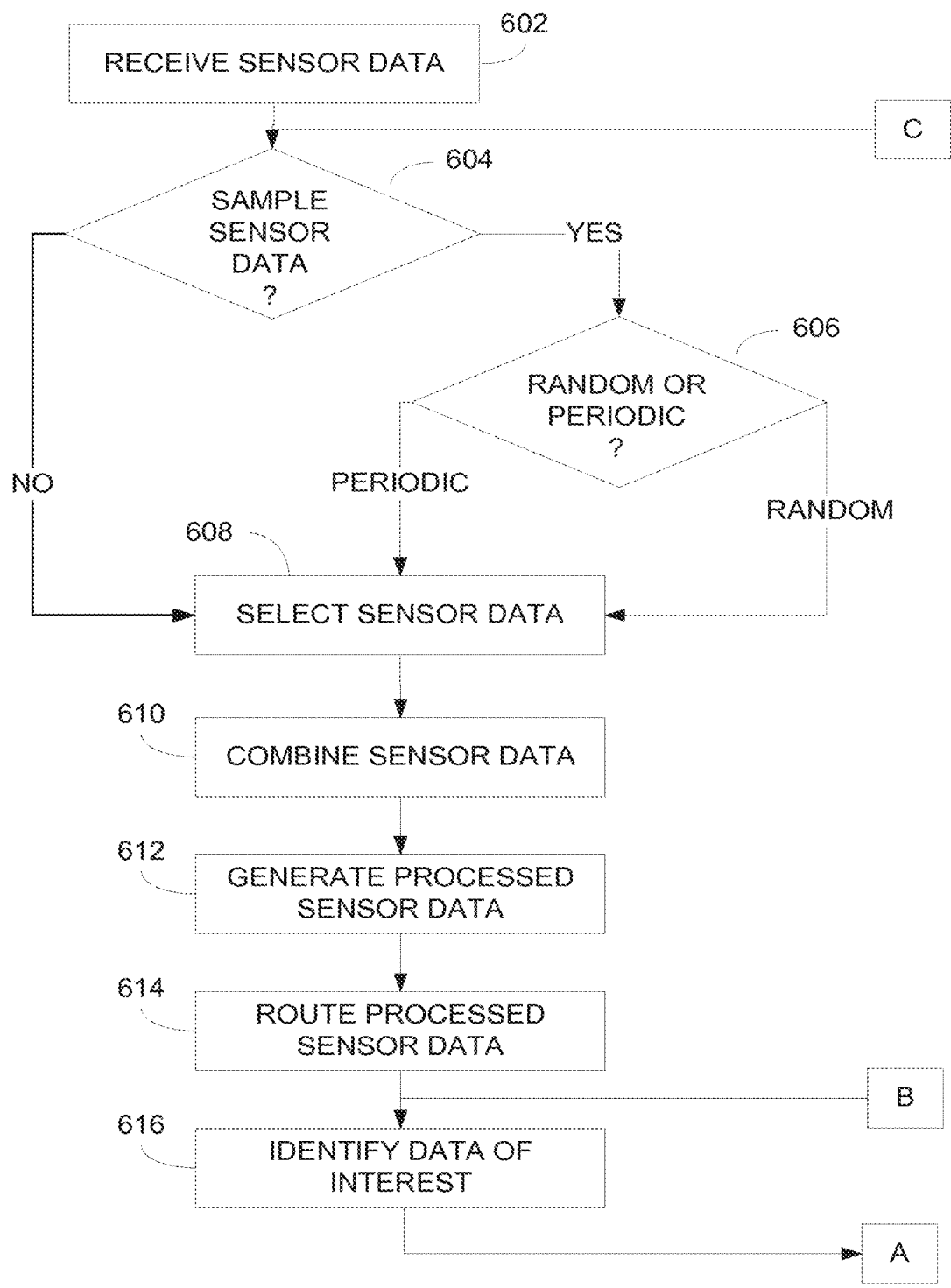
FIG. 6 is a process flow diagram illustrating example operation of the analysis system of FIG. 5.

FIG. 6 is a process flow diagram illustrating an example operation of the analysis system 500 illustrated in FIG. 5. In block 602, sensor data is received by the data formation module 508 from a number of sensors 502. At block 604 it is determined whether any of the sensor data received is raw data. If the sensor data is raw data, at block 606 the sensor data is sampled by random sampling, or periodic sampling. The random sampling rate may be at a lower frequency than the periodic sample rate. The operation than proceeds to block 608 where sensor data received from at least some of the sensors is selected. If, at block 604, the sensor data is not raw data, the operation proceeds to block 608 to select sensor data from at least some of the sensors. Selection of sensor data by the data formation module 508 may be based on one or more criteria including whether sensor data from multiple sensors will be used for cooperative compressive sensing, whether perspective view extensions to compressive sensing are to be created using sensor data from multiple sensors, whether sensor data from multiple sensors are being used for failover or diagnostics and/or based on the recognition module 510 for which sensor data is being processed. In addition, sensor data from multiple sensors may be selected to create a group of sensors providing adaptive group compressive sensing.

At block 610, at least some of the sensor data may be combined. Alternatively, none of the sensor data may be combined, and this step may be omitted. Generation of processed sensor data may occur at block 612. The processed sensor data may be generated with sensor data from one or more sensors that will provide a high likelihood of including data of interest for the respective recognition module 510, while minimizing the quantity of sensor data subject to analysis by the respective recognition module 510 to identify data of interest. The generated processed sensor data may be routed to the corresponding recognition module 510 at block 614. At block 616, the recognition module 510 may identify data of interest troth within the processed sensor data. The data of interest may be identified based on comparison of the processed sensor data with a sampling dictionary 532.

Figure 7:
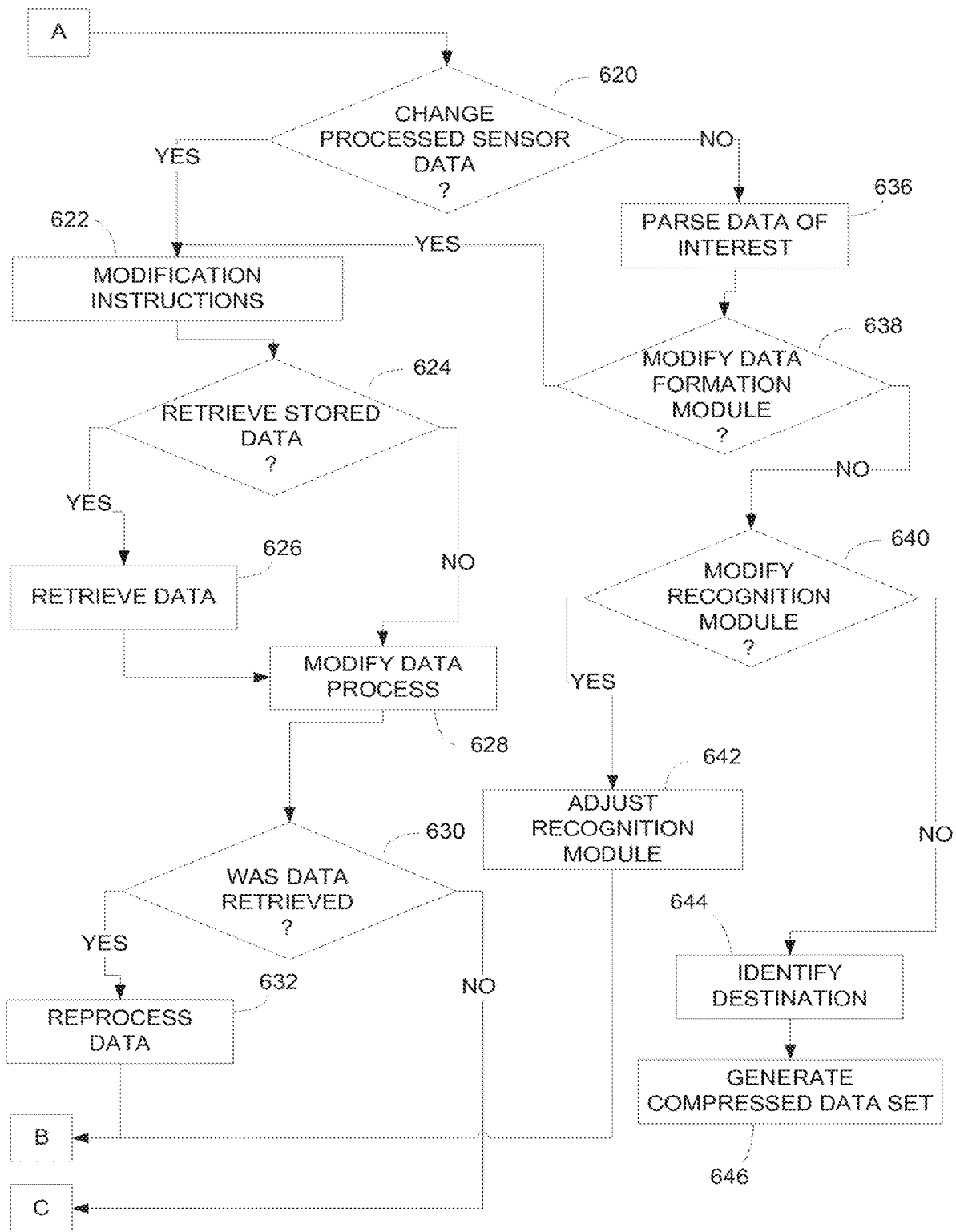
FIG. 7 is a second part of the process flow diagram of FIG. 6.

Referring to FIG. 7, the recognition modules 510 may determine whether different, additional, and/or revised processed sensor data is warranted at block 620. If changes to the processed sensor data are needed, the recognition modules may communicate modification instructions to the data formation module 508 and/or the sensors at block 622. At block 624 it is determined if stored or cached sensor data should be retrieved due to, for example, the need for raw data or sensor data sampled randomly instead of periodically, and/or at a different sample rate. If yes, stored sensor data may be retrieved at block 626, such as, for example, stored sensor data corresponding to a period of time when identified data of interest occurred. The data processing of the data formation module 508 may be modified according to the modification instructions at block 628. If retrieval of stored or cached sensor data is not needed at block 624, the data processing of the data formation module 508 may be modified according to the modification instructions at block 628.

At block 630, it is determined if stored sensor data was retrieved. If yes, the stored data is re-processed using the modified processing of the data formation module 508 and the corresponding recognition module 510 at block 632, and the operation returns to block 616 (FIG. 6) to identify data of interest in the revised processed sensed data. If there is no retrieved data at block 630, the operation returns to block 604 (FIG. 6) to receive and process future sensor data with the data formation module 508 using the modified processing. Returning to block 620, if no changes to the processed sensor data are needed, the operation continues to block 636 where the data of interest is received and parsed by the staging module 512. At block 638 it is determined if modification instructions should be communicated to the data formation module 508.

If modification of the processing of the data formation module 508 is needed, the operation returns to block 622, whereas if no modification of the data formation module is needed, at block 638, the operation proceeds block 640 to determine if modification to the respective recognition module 510 is needed. If modification of the respective recognition module 510 is needed, the identification process of the respective recognition module 510 is modified at block 642 and the operation returns to block 616 (FIG. 6) to identify data of interest using the modified identification process of the respective recognition module 510. If no modification of the respective recognition module 510 is needed at block 640, the operation continues to block 644 to identify one or more destinations. At block 646, based on the identified destinations, a compressed data set is generated using one or more of the identified data of interest from one or more of the recognition modules 510.

With the previously described analysis system, sensor data received from one or more sensors disposed in an industrial environment may be selectively processed and used to generate compressed data sets that are transmitted to one or more destinations, such as over a network. Sensor data from only selected sensors may be used with one or more data sample processing techniques, such as random sampling, grouping and combining to minimize the amount of processed sensor data generated and routed to a recognition module for which the sensors are selected. The processed sensor data may be analyzed with the recognition module to identity data of interest to further reduce the data being processed. Based on the identified data of interest, the set of compressed data may be generated to include identified data of interest from one or more of the recognition modules. Thus, the analysis system can provide, for example, a) cooperative compressive sensing, b) perspective view extensions to compressive sensing, c) adaptive compressive sensing failover and diagnostics, d) adaptive group compressive sensing based on network events, control events, underlying image content characteristics/correlations, e) switching on the fly between compressive sensing and raw sensing, and/or f) power savings.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (such as subroutines) of a single program, separate programs, distributed across several memories and processors, or implemented in many different ways, such as in a library, such as a shared library (such as a dynamic link library (DLL)). The DLL, for example, may store code that performs any of the system processing described above.

Various implementations have been specifically described. However, many other implementations are also possible.

What is claimed is:
1. A system, comprising:
processing circuitry, at one or more first locations, configured to
receive first sensor data from a first sensor and second sensor data from a second sensor;
dynamically select at least one of the first sensor data or the second sensor data;
process sampled data, from the selected at least one of the first sensor data or the second sensor data, to generate processed sensor data;

identify first data of interest from the processed sensor data by executing data recognition instructions;
determine whether to dynamically modify the data recognition instructions;
in response to the data recognition instructions being determined to be dynamically modified,
dynamically modify the data recognition instructions to identify the first data of interest,
identify, by executing the modified data recognition instructions, second data of interest from the processed sensor data, and
process the second data of interest to create third data;
compress the third data by applying a filter to create a set of filtered data; and
transmit the set of filtered data to a second location via a communication path, wherein
the processing circuitry dynamically selects the at least one of the first sensor data or the second sensor data in accordance with a performance of the communication path.

2. The system of claim 1, wherein the processing circuitry is configured to dynamically modify the data recognition instructions in accordance with a previous identification of the first data of interest.

3. The system of claim 1, wherein the processing circuitry is configured to dynamically control at least one of a type of sampling or a frequency of sampling of the first sensor data and the second sensor data.

4. The system of claim 3, wherein the processing circuitry is configured to dynamically control said at least one of the type of sampling or the frequency of sampling of currently received data.

5. The system of claim 3, wherein the processing circuitry is configured to dynamically control said at least one of the type of sampling or the frequency of sampling of previously stored data.

6. The system of claim 1, wherein the processing circuitry is configured to identify the first data of interest in accordance with background information.

7. The system of claim 6, wherein the background information is detected in the processed sensor data.

8. The system of claim 1, wherein the first sensor and the second sensor are disposed at one of the one or more first locations.

9. One or more non-transitory computer readable media including computer-program instructions, which when executed by an information processing system, cause the information processing system to:
receive first sensor data from a first sensor and second sensor data from a second sensor;
dynamically select at least one of the first sensor data or the second sensor data;
process sampled data, from the selected at least one of the first sensor data or the second sensor data, to generate processed sensor data;
identify first data of interest from the processed sensor data by executing data recognition instructions;
determine whether to dynamically modify the data recognition instructions;
in response to the data recognition instructions being determined to be dynamically modified,
dynamically modify the data recognition instructions to identify the first data of interest,
identify, by executing the modified data recognition instructions, second data of interest from the processed sensor data, and
process the second data of interest to create third data;
compress the third data by applying a filter to create a set of filtered data; and
transmit the set of filtered data to a second location via a communication path, wherein
the information processing system dynamically selects the at least one of the first sensor data or the second sensor data in accordance with a performance of the communication path.

10. The system of claim 1, further comprising the first sensor and the second sensor.

11. The system of claim 1, wherein the processing circuitry is configured to include a plurality of different recognition circuits, each configured to identify different data of interest, and the first sensor data and the second sensor data are selectively mapped to the different recognition circuits so that the processed sensor data selectively includes at least one of the first sensor data or the second sensor data based on one of the recognition circuits to which the processed sensor data is provided.

12. The system of claim 11, wherein the processing circuitry is configured to randomly sample at least one of the first sensor data or the second sensor data at different random sampling rates based on which of the different recognition circuits the processed sensor data is provided.

13. The system of claim 12, wherein the processing circuitry is further configured to adjust the randomly sampled data included in the processed sensor data in response to identification of the data of interest.

14. The system of claim 1, wherein the processing circuitry is further configured to receive third sensor data of a third sensor, and add the third sensor data to the processed sensor data in response to identification of the data of interest.

15. The system of claim 1, wherein the processing circuitry dynamically selects the at least one of the first sensor data or the second sensor data based on an assigned priority of the first sensor and the second sensor.

16. The system of claim 1, wherein the processing circuitry dynamically selects the at least one of the first sensor data or the second sensor data based on a level of quality of the first sensor data and a level of quality of the second sensor data.

17. The system of claim 1, wherein the processed sensor data includes a combination of the first sensor data and the second sensor data based on a predetermined mapping of sensor candidates that include the first sensor and the second sensor.

18. A method, comprising:
receiving first sensor data from a first sensor and second sensor data from a second sensor;
dynamically selecting, by processing circuitry of an analysis system, at least one of the first sensor data or the second sensor data;
processing sampled data, from the selected at least one of the first sensor data or the second sensor data, to generate processed sensor data;
identifying first data of interest from the processed sensor data by executing data recognition instructions;
determining whether to dynamically modify the data recognition instructions;
in response to the data recognition instructions being determined to be dynamically modified,
dynamically modifying the data recognition instructions to identify the first data of interest, identifying, by executing the modified data recognition instructions, second data of interest from the processed sensor data, and processing the second data of interest to create third data;

compressing the third data by applying a filter to create a set of filtered data; and transmitting the set of filtered data to a second location via a communication path, wherein the dynamically selecting the at least one of the first sensor data or the second sensor data is performed in accordance with a performance of the communication path.

19. The method according to claim 18, wherein the dynamically modifying the data recognition instructions is performed in accordance with a previous identification of the first data of interest.

20. The method according to claim 19, further comprising dynamically controlling at least one of a type of sampling or a frequency of sampling of the first sensor data and the second sensor data.

\* \* \* \* \*